United States Patent
Stanchina (10) Patent No.: US 11,249,205 B2
(45) Date of Patent: Feb. 15, 2022

(54) METHOD FOR DETERMINING A BIAS AFFECTING PIXELS OF A PIXELATED DETECTOR OF IONIZING RADIATION

(71) Applicant: Commissariat à l'Energie Atomique et aux Energies Alternatives, Paris (FR)

(72) Inventor: Sylvain Stanchina, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 17/130,853

(22) Filed: Dec. 22, 2020

(65) Prior Publication Data

US 2021/0190980 A1 Jun. 24, 2021

(30) Foreign Application Priority Data

Dec. 24, 2019 (FR) ..................................... 19 15587

(51) Int. Cl.
*G01T 1/24* (2006.01)
(52) U.S. Cl.
CPC .............. *G01T 1/247* (2013.01); *G01T 1/241* (2013.01)
(58) Field of Classification Search
CPC ................................ G01T 1/241; G01T 1/247
See application file for complete search history.

(56) References Cited

U.S. PATENT DOCUMENTS

| 5,428,223 A * | 6/1995 | Jatteau | ................... G01T 1/1642 |
| | | | 250/362 |
| 6,243,441 B1 * | 6/2001 | Zur | ........................... G01T 1/24 |
| | | | 257/E27.146 |

(Continued)

FOREIGN PATENT DOCUMENTS

WO   WO 2018/229470 A1   12/2018

OTHER PUBLICATIONS

French Preliminary Search Report dated Sep. 23, 2020 in French Application 19 15587 filed Dec. 24, 2019 (with English Translation of Categories of Cited Documents and Written Opinion), 10 pages.

*Primary Examiner* — Blake C Riddick
(74) *Attorney, Agent, or Firm* — Oblon, McClelland, Maier & Neustadt, L.L.P.

(57) ABSTRACT

A method for determining a bias ($\beta_{i,j}$) affecting at least one pixel of a detector (1) of ionizing radiation, the detector comprising a plurality of pixels ($10_{i,j}$), each pixel being configured to collect charge carriers (6) generated by an interaction of the ionizing radiation in the detector, and to form a pulsed signal under the effect of the generation and collection of the charge carriers, the pixels being distributed in a matrix array, the method comprising:
a) following the occurrence of an interaction in the detector, determining a pixel forming a pulse that exceeds an amplitude threshold, during a detection time interval;
b) among each pixel determined in step a), selecting a pixel of interest that generates a highest amplitude;
c) selecting at least one distant pixel ($10_f$), the position of the distant pixel, with respect to the pixel of interest, being defined beforehand;
d) measuring an amplitude of a signal generated by each distant pixel;

(Continued)

e) on the basis of each measurement performed in step d), determining a bias at the detection time for each distant pixel.

12 Claims, 4 Drawing Sheets

(56) References Cited

U.S. PATENT DOCUMENTS

| | | | |
|---|---|---|---|
| 7,265,327 B1* | 9/2007 | Park | H01L 27/14603 250/208.1 |
| 2005/0023475 A1* | 2/2005 | Li | H01L 27/14659 250/370.09 |
| 2007/0145257 A1* | 6/2007 | Petrillo | G01T 1/169 250/252.1 |
| 2007/0145274 A1 | 6/2007 | Iida | |
| 2007/0290142 A1* | 12/2007 | Du | G01T 1/241 250/370.09 |
| 2009/0121139 A1* | 5/2009 | Chamming's | H04N 5/3655 250/340 |
| 2010/0193697 A1* | 8/2010 | Bal | G01T 1/249 250/370.09 |
| 2011/0248175 A1* | 10/2011 | Frach | G01T 1/2018 250/363.03 |
| 2011/0248319 A1* | 10/2011 | Berg | H01L 27/088 257/253 |
| 2012/0205529 A1* | 8/2012 | Chamming's | H04N 5/3651 250/252.1 |
| 2014/0194298 A1* | 7/2014 | Rothberg | C12Q 1/6874 506/2 |
| 2019/0050970 A1* | 2/2019 | Cresens | G06T 5/005 |
| 2020/0158836 A1* | 5/2020 | Henderson | G01S 7/4863 |
| 2020/0182983 A1* | 6/2020 | Calder | G01S 7/4863 |
| 2020/0209415 A1 | 7/2020 | Veale | |
| 2020/0217965 A1* | 7/2020 | Calder | G01S 7/487 |
| 2021/0124065 A1* | 4/2021 | Rho | G01T 1/247 |

* cited by examiner

Fig. 4B ated detector is used, the bias β and gain α may be determined for each pixel.
METHOD FOR DETERMINING A BIAS AFFECTING PIXELS OF A PIXELATED DETECTOR OF IONIZING RADIATION

TECHNICAL FIELD

The invention relates to detectors of ionizing radiation, in particular photonic X-rays or gamma radiation.

PRIOR ART

Devices for detecting ionizing radiation, based on gaseous, semiconductor or scintillating detector materials, allow electrical pulses formed by interactions of the radiation in the detector material to be obtained. The amplitude of each pulse depends on the energy deposited by the radiation in the course of each interaction. These devices are frequently used in applications requiring the energy of the ionizing radiation incident on the detector to be known. The fields of application are broad, and notably comprise non-destructive testing (baggage screening for example), medical diagnostics or measurements in nuclear installations. Generally, the devices used are pixelated, so as to generate spatially resolved information. The detecting device may be linear when the pixels are aligned to form a line. It may also be two-dimensional when the pixels are distributed in a matrix array, so as to form an image.

Under the effect of an interaction between radiation and the detector material, one or more pixels generate an electrical pulse, the amplitude of which is correlated with the energy released by the radiation during the interaction. Each pixel is connected to an electronic circuit for processing pulses. This circuit allows an estimation of the amplitudes thereof that is as precise as possible. The estimation of the amplitude of the pulses generated by each pixel allows the energy of the interaction to be estimated. This energy must be estimated as precisely as possible. The addressed energy range is generally comprised between 10 keV and a few hundred keV, or even a few MeV. It is desirable for the precision of the energy to be about one %, or even lower.

The estimation of the amplitude allows a spectrum of the radiation detected by each pixel to be formed, using the well-known principles of spectrometry. It will be recalled that a spectrum is a histogram of the amplitudes of the pulses detected during an acquisition period. If the relationship between the amplitude of a pulse and an energy corresponding to this amplitude is known, an amplitude spectrum may be converted into an energy spectrum. The estimation of the energy also allows a spectral image, i.e. an image in one or more predefined energy bands, to be established.

The estimation of energy, on the basis of the amplitude of each pulse, is carried out taking into account a gain term and a bias term, so as to form a relationship, which is generally linear. The gain is a multiplication term, whereas the bias is an additive term. Thus, if A corresponds to an amplitude of the pulse, and E corresponds to the energy released in the detector, it is possible to determine a gain α and a bias β, such that E=αA-β. α and β are positive scalars. When a pixelated detector is used, the bias β and gain α may be determined for each pixel.

A drift in the bias or in the gain leads to a drift in the energy estimated on the basis of the measured amplitude. As regards the bias, it is possible to perform calibrations by exposing the device to what may be considered to be no radiation. However, this assumes a specific calibration operation, outside of normal use of the device.

The invention described below allows the bias affecting pixels of a pixelated detector to be tracked. Such tracking allows the drift in the bias over time to be better monitored. A better precision in the estimation of the energy results therefrom. One advantage of the invention is that it does not require operation of the device to be interrupted.

SUMMARY OF THE INVENTION

One subject of the invention is a method for determining a bias affecting at least one pixel of a detector of ionizing radiation, the detector comprising a plurality of pixels, each pixel being configured to collect charge carriers generated by an interaction of the ionizing radiation in the detector, and to form a pulse under the effect of the generation and collection of the charge carriers, the pixels being distributed in a matrix array, the method comprising:
  a) following the occurrence of an interaction in the detector, at a detection time, determining at least one pixel forming a pulse that exceeds an amplitude threshold defined beforehand, during a detection time interval established on the basis of the detection time;
  b) among each pixel determined in step a), selecting the pixel that generates a highest amplitude during the detection time interval, the selected pixel being a pixel of interest;
  c) selecting at least one distant pixel, the position of the distant pixel, with respect to the pixel of interest, being defined beforehand, such that the effect of the interaction, detected by the pixel of interest, on the distant pixel, may be considered to be negligible;
  d) measuring an amplitude of a signal generated by each distant pixel in the detection time interval;
  e) on the basis of each measurement performed in step d), determining a bias at the detection time for each distant pixel;
  f) updating a bias affecting each distant pixel depending on the bias determined at the detection time.

Steps a) and f) may be repeated each time an interaction occurs in the detector that leads, in step a), to an amplitude threshold of at least one pixel to be exceeded.

According to one embodiment, step a) comprises:
  determining a detection time, at which a first pixel forms a first pulse that exceeds the amplitude threshold;
  defining the detection time interval, which extends from the detection time, the duration of the detection time interval being predefined;
  determining, in the detection time interval, pixels forming a pulse that exceeds the amplitude threshold.

The detection time interval may comprise times prior to the detection time. It then lies on either side of the detection time.

According to one embodiment, step b) comprises selecting a plurality of distant pixels, the position of each distant pixel with respect to the pixel of interest being defined beforehand.

With each pixel is associated one or more positions, such that when the pixel is a pixel of interest, each associated position corresponds to one distant pixel. Two different pixels are preferably associated with at least two different positions.

The position of each distant pixel, in the matrix array of pixels, may change depending on the position of the pixel of interest, in the matrix array of pixels.

According to one embodiment, in step f):
  prior to the detection time, each pixel is affected by a current bias;

following detection of the interaction, the bias is updated, for each distant pixel, depending on the current bias and on the bias determined at the detection time.

The current bias may be initialized to a predefined value, zero for example. The bias may be updated via a weighted summation of the current bias and of the bias at the detection time. According to one possibility, the bias of a distant pixel, at the detection time, is affected by a weighting factor that varies as a function of a number of updates of the bias that have been performed for the distant pixel since an initialization, such that the lower the number of updates of the bias that have been performed, since initialization, the higher the contribution of the bias measured at the measurement time. In other words, the lower the number of updates of the bias, the higher the weighting factor.

Each weighting factor may be initialized, notably on start-up of the detector, to a value that is identical for all the pixels.

According to one embodiment, the method comprises, following step b):
- selecting at least one pixel adjacent the pixel of interest;
- measuring the amplitude of the pulse generated by the pixel of interest and of the pulse generated by each adjacent pixel;
- estimating an energy released in the course of the interaction depending on the amplitudes measured for the pixel of interest and for each adjacent pixel.

The selected adjacent pixels may be the pixels adjacent the pixel of interest in two orthogonal directions.

According to one embodiment, each pixel comprises a peak detector, such that an interaction is considered to have been detected when an amplitude of a pulse, resulting from the collection of charge by the pixel, exceeds the predefined amplitude threshold. The method then comprises a periodic reset of each peak detector.

Between two successive resets of a peak detector, the method may comprise estimating a drift signal that adds to the signal resulting from the collection of charge by the pixel. The method may then be such that, in step e), the drift signal estimated at the detection time is subtracted from the bias.

A second subject of the invention is a method for estimating an energy corresponding to charge carriers collected by a pixel of a pixelated detector for detecting ionizing radiation, each pixel being configured to collect charge carriers generated by an interaction of the ionizing radiation in the detector, and to form a pulse under the effect of the collection of the charge carriers, the pixels being distributed in a matrix array, the method comprising, when the amplitude of a pulse formed by the pixel, following a collection of charge carriers, exceeds a predefined threshold:
- determining the amplitude of the pulse;
- applying an energy-quantification function to the determined amplitude; the method being characterized in that the energy-quantification function is parameterized by a bias, the bias being estimated using a method according to the first subject of the invention.

The pixel may be the pixel of interest or a pixel adjacent the pixel of interest, such as defined with reference to the first subject of the invention.

A third subject of the invention is a device for detecting ionizing radiation, comprising various pixels of a pixelated detector, each pixel being configured to collect charge carriers generated by an interaction of the ionizing radiation in the detector, and to form a pulse under the effect of the collection of the charge carriers, the device comprising a microprocessor configured to implement steps b) to f) of a method according to the first subject of the invention for each pulse formed by at least one pixel.

The invention will be better understood on reading the description of the exemplary embodiments, which are described, in the rest of the description, with reference to the figures listed below.

DESCRIPTION OF PARTICULAR EMBODIMENTS

Figure 1A:
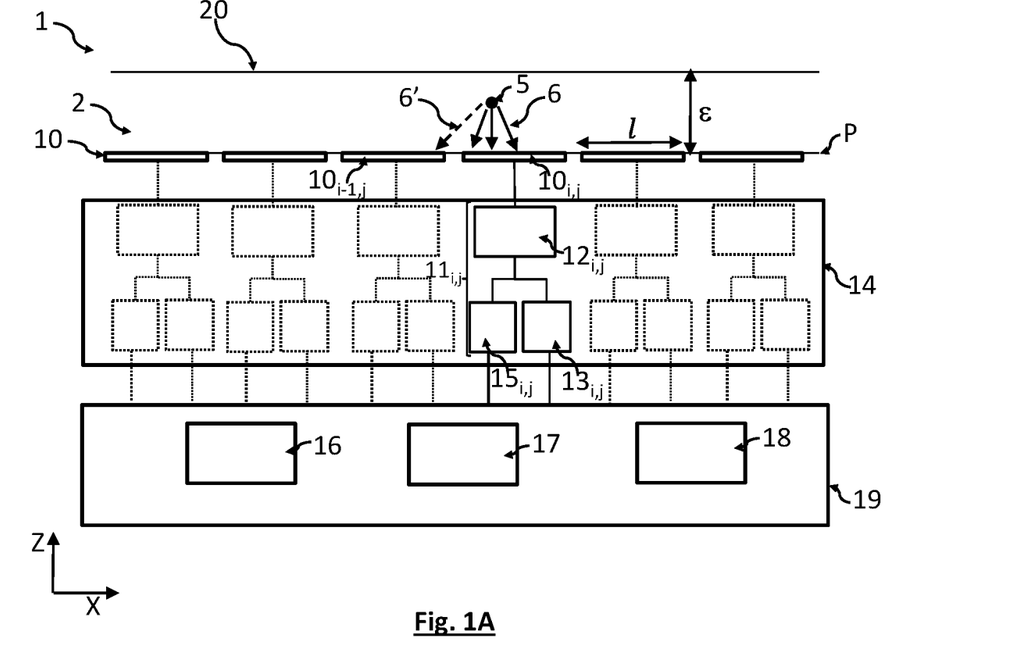
FIG. 1A schematically shows the main components of a detector of ionizing radiation.
Figure 1B:
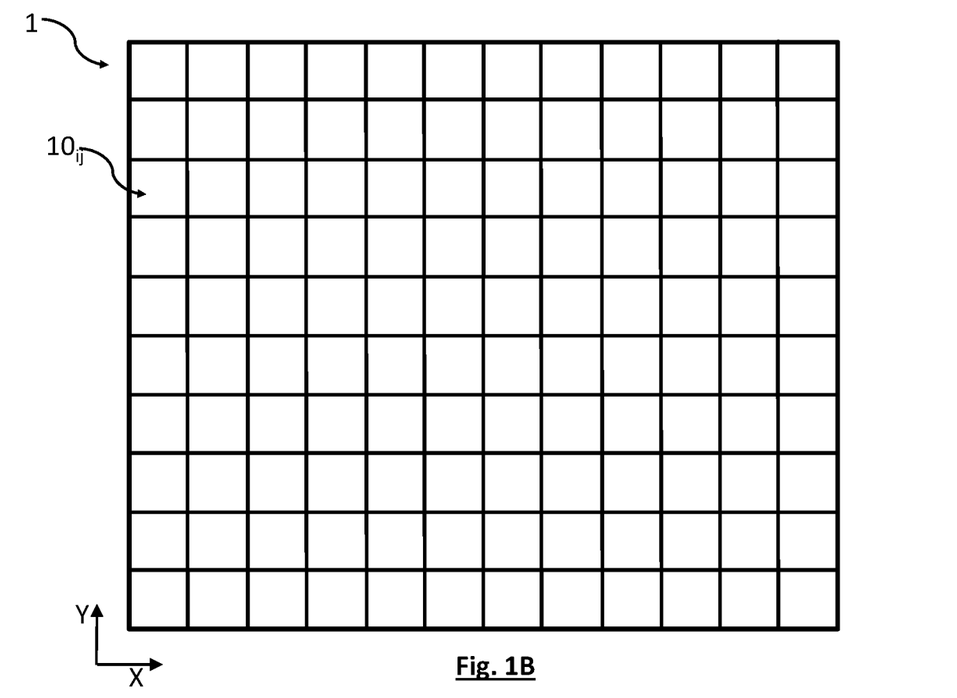
FIG. 1B schematically shows a matrix array of pixels.

FIGS. 1A and 1B show a pixelated radiation detector 1 configured to interact with ionizing radiation 5. By ionizing radiation, what is meant is radiation formed from particles able to ionize matter. It may be a question of alpha radiation, beta radiation, photonic X-rays or gamma radiation, or even neutron radiation. In the example shown, the radiation is photonic gamma radiation, formed from photons the energy of which is for example comprised between 1 keV and 2 MeV. The invention is particularly suitable for exposure of the radiation detector to isotopic gamma-emitting sources.

In the example shown, the detector comprises a semiconductor detector 2, of CdTe type, but it could also be a question of any semiconductor commonly employed to detect ionizing radiation (for example Ge, Si or CdZnTe). The semiconductor is biased by an electric field E, which forms between an anode 10 and a cathode 20. When a particle, in the present case a photon, of the ionizing radiation 5 interacts in the detector 1, charge carriers 6 are formed and migrate toward a collecting electrode 10 that is segmented into pixels $10_{i,j}$. In the example shown, the collecting electrode is an anode. The amount of charge Q collected by a pixel $10_{i,j}$ depends, preferably linearly, on the energy E released by the particle under the effect of the interaction.

The radiation detector 1 thus comprises a plurality of pixels $10_{i,j}$ arranged in a plane, called the detection plane P, as shown in FIG. 1B. The indices i and j designate the coordinates of each pixel in the detection plane. The pixels are arranged in a, preferably regular, two-dimensional matrix array. In the examples described in this application, the detection plane P is defined by two perpendicular axes X and Y. Each pixel is for example a square of side length l, l varying for example between 500 μm and 1 cm. Perpendicular to the axes X and Y, the semiconductor of the detector 2 has a thickness ε, parallel to an axis Z. The thickness ε is for example comprised between 500 μm and 5 mm. The number of pixels may be several tens, or even several hundreds, along the X-axis and the Y-axis. For example, the pixels may be grouped into subsets of 256 pixels (16×16 pixels), the subsets being placed side-by-side one another so as to form the detector 1.

Other types of detectors (for example scintillators coupled to a photon/charge carrier converter) are usable, provided that they allow an amount of charge Q to be collected under the effect of energy E released by the ionizing radiation in the course of an interaction in the detector material. It may notably be a question of detectors based on an assembly of scintillators and photomultiplier tubes or of scintillators and photodiodes.

Each pixel $10_{i,j}$ comprises an electronic processing circuit $11_{i,j}$, comprising:
- a circuit $12_{i,j}$ for forming a voltage pulse under the effect of the collection of charge carriers. It is a question of a circuit known to those skilled in the art, allowing a current-voltage conversion. It comprises a preamplifier, an amplifier and a shaping circuit, the latter usually been designated a shaper,
- a threshold comparator $13_{i,j}$, which addresses a triggering signal when the amplitude of a pulse resulting from the circuit $12_{i,j}$ crosses a predefined amplitude threshold.
- a peak detector $15_{i,j}$, allowing a highest value of the signal resulting from each pulse-forming circuit $12_{i,j}$ to be stored in memory. It may be a question of a memory allowing a highest value of the signal output from the circuit $12_{i,j}$ to be stored in memory, for a predefined length of time, 15 µs for example.

Each peak detector $15_{i,j}$ may be reset at regular time intervals, as described below. Each peak detector may also be reset at the end of a detection time interval dt defined following the trigger of a threshold comparator $13_{i,j}$. The detection interval is defined below. Each peak detector $15_{i,j}$ is placed in parallel with a threshold comparator $13_{i,j}$.

In this example, the various processing circuits $11_{i,j}$, associated with various pixels $10_{i,j}$, respectively, are formed in an integrated circuit 14. The integrated circuit may take the form of an application-specific integrated circuit (ASIC).

The index i,j means that, in this example, there is one processing circuit per pixel. Alternatively, a given processing circuit is common to a plurality of pixels, the processing of the signals received from each pixel being multiplexed. The electronic processing circuit $11_{i,j}$ may comprise an analogue-digital converter, the ASIC then processing digital signals. The analogue converter may be placed at the output of the integrated circuit 14.

The integrated circuit 14 is connected to a downstream processing unit 19, the latter being configured to perform the following operations:
- under the effect of a threshold comparator $13_{i,j}$ being triggered at a detection time t, taking into account a detection time interval dt;
- during the detection time interval dt, identifying pixels forming a pulse the amplitude of which exceeds the amplitude threshold;
- selecting, among the identified pixels, a pixel of interest $10_{int}$, which is the pixel forming a pulse the amplitude of which is highest among the pulses having exceeded the amplitude threshold.

In this example, the processing unit 19 comprises digital components, taking the form of a field programmable gate array (FPGA), i.e. of an integrated circuit composed of a network of programmable cells.
- a module 16 for determining a bias corresponding to each pixel. The processing unit 19 may address a few tens or even a few hundred pixels, 256 pixels for example.
- a memory 17, for storing the values of the biases respectively determined for each pixel;
- a module 18 for quantifying energy on the basis of the amplitude resulting from the processing circuit $11_{i,j}$, using a calibration function g, the latter notably being parameterized by the bias stored in memory for each pixel.

The processing unit 19 may also process digital data logically. In such a case, the module 16 and 18 listed above may take the form of functions coded into a memory and implemented by a microprocessor.

Figure 2A:
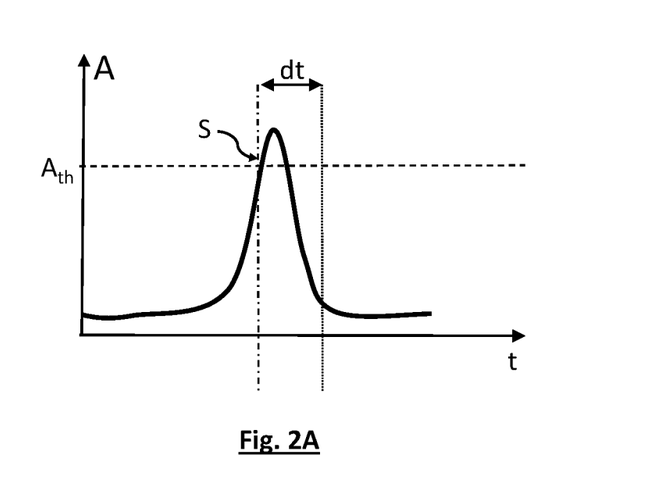
FIG. 2A shows a pulse formed by a first pixel, at a detection time, this pulse causing a threshold comparator to be triggered and a detection time interval extending from the detection time to be taken into account.

FIG. 2A schematically shows a pulse formed by a first pixel, i.e. a pixel forming a pulse the amplitude of which exceeds the predefined threshold $A_{th}$. The time at which the amplitude exceeds the threshold is a detection time t. A detection time interval dt is defined with respect to the detection time t. The detection time interval dt has a predefined duration, 5 µs for example. It extends from the detection time t. It may also lie on either side of the detection time t, for example between t−2 µs and t+3 µs. As indicated above, in the detection time interval dt, the ASIC14 identifies pixels that have formed pulses the amplitude of which exceeds the amplitude threshold $A_{th}$. Among the latter, the processing unit 19 selects the pixel of interest $10_{int}$, i.e. the pixel that reaches the highest amplitude $A_{max}$ in the detection time interval.

Figure 2B:
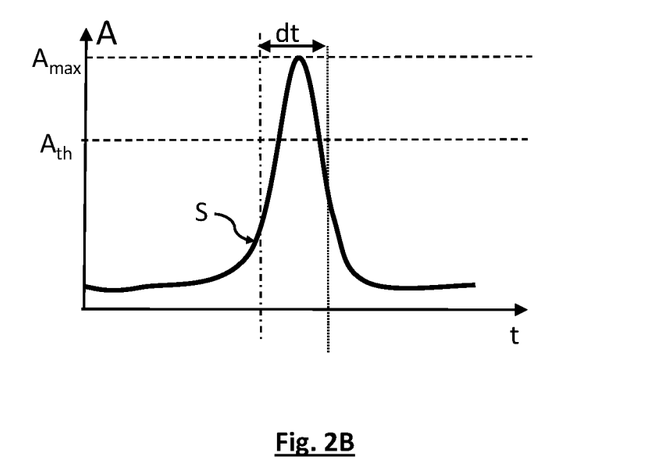
FIG. 2B shows a pulse formed by a pixel of interest during the detection time interval.

FIG. 2B schematically shows a pulse formed by the pixel of interest. Its amplitude $A_{max}$ is higher than the amplitudes of the pulses formed by other pixels, in the detection time interval dt.

As described with reference to the prior art, on the basis of the amplitude A of the pulse formed by each pixel, it is possible to estimate an energy released by the interaction of the photon in the detector. To this end, a quantification function g allowing energy to be quantified on the basis of amplitude is applied. It may be a question of a linear relationship, for example one taking the form of an affine quantification function g such that:

$$E = g_{\alpha,\beta}(A) = \alpha A - \beta \qquad (1)$$

The notation $g_{\alpha,\beta}$ means that the function g is parameterized by the gain α and the bias β.

When all of the charge carriers are collected by a single pixel, the energy E corresponds to the energy released in the detector by the interaction of the photon.

As mentioned in the prior art, the coefficients α and β are positive real numbers, α is a gain, and β is a bias.

The coefficients α and β are variable from one pixel to the next. In the rest of the description, $\alpha_{i,j}$ and $\beta_{i,j}$ are the gains and biases respectively associated with each pixel $10_{i,j}$. The coefficients $\alpha_{i,j}$ and $\beta_{i,j}$ are the parameters of the quantification function g defined for each pixel. Determination thereof makes it possible to refine the estimation of the energy transported by the charge carriers collected by the pixel on the basis of the amplitude A of a pulse S formed by the electronic circuit $11_{i,j}$ of each pixel $10_{i,j}$. It is therefore important that the coefficients $\alpha_{i,j}$ and $\beta_{i,j}$ be determined with precision. The coefficients $\alpha_{i,j}$ and $\beta_{i,j}$ may be determined via an energy calibration, in the course of which, as mentioned above, each pixel is exposed to radiation the energy spectrum of which contains singularities. Such a calibration may be carried out prior to start-up of the detector. However, during use of the detector, the bias $\beta_{i,j}$ may vary. As a result, an error arises in the quantification of the energy on the basis of the amplitude of the pulse S formed by the electronic circuit $11_{i,j}$ associated with the pixel.

It is therefore important to estimate, with the best possible precision, and as regularly as possible, the bias $\beta_{i,j}$ associated with each pixel. As indicated above, for a given pixel, the bias $\beta_{i,j}$ may vary randomly as a function of time. It is therefore important that it be regularly updated.

Figure 3:
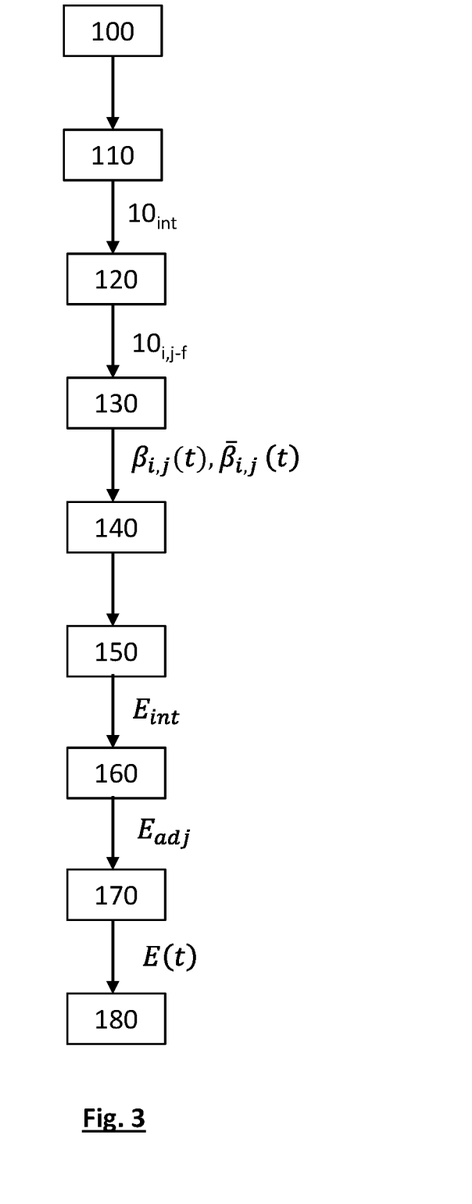
FIG. 3 shows the main steps of a method according to the invention.

A method for estimating the bias $\beta_{i,j}$ of the pixels $10_{i,j}$ of the detector, the steps of which are schematically shown in FIG. 3A, will now be described. Generally, prior to use of the detector 1, the gain $\alpha_{i,j}$ and the bias $\beta_{i,j}$ have already been determined. Thus, the bias $\beta_{i,j}$ of each pixel $10_{i,j}$ is initialized to an initial value.

Step 100: Detecting an Interaction

On the occurrence of an interaction in the detector material 2, releasing sufficient energy, a first pixel $10_{i,j}$ collects a significant charge Q. Following the collection of this charge, the electronic processing circuit $11_{i,j}$ associated with the pixel forms a pulse S the amplitude of which causes the threshold comparator to trigger. In this case, an interaction is considered to be detected, at a detection time t. As described above, a detection time interval dt is defined, which extends from the interaction time t. The detection time interval dt may lie on either side of the interaction time t. The duration of the detection time interval dt is predefined.

Step 110: Selecting the Pixel of Interest.

In the detection time interval dt, pixels that have formed a pulse that exceeds the amplitude threshold $A_{th}$ are identified. The processing unit 19 selects the pixel (this pixel is called the pixel of interest $10_{int}$) that has formed the pulse the amplitude $A_{max}$ of which is highest. It is a question of the pixel considered to be, parallel to the detection plane P, closest to the site of the interaction.

This step is implemented using the downstream processing unit 19, the latter temporarily storing the signals resulting from each pixel.

At the end of step 120, the coordinates $(i_{int}, j_{int})$ of the pixel of interest $10_{int}$ are known.

Step 120: Selecting One Distant Pixel or a Plurality of Distant Pixels.

In this step, which is carried out by the bias-determining module 16, at least one pixel $10_{i,j-f}$ that is distant from the pixel of interest $10_{int}$ is selected. By distant pixel $10_{i,j-f}$ what is meant is a pixel that is considered to be sufficiently distant that it may be considered that no, or a negligible amount, of charge will have been collected following the interaction that occurred at the detection time t. The relative position of each distant pixel $10_f$ with respect to the pixel of interest $10_{int}$ is determined beforehand. Thus, when a pixel of interest $10_{int}$ has been located, the position of each distant pixel $10_f$ is assigned automatically, on the basis of the predefined relative position.

Figure 4A:
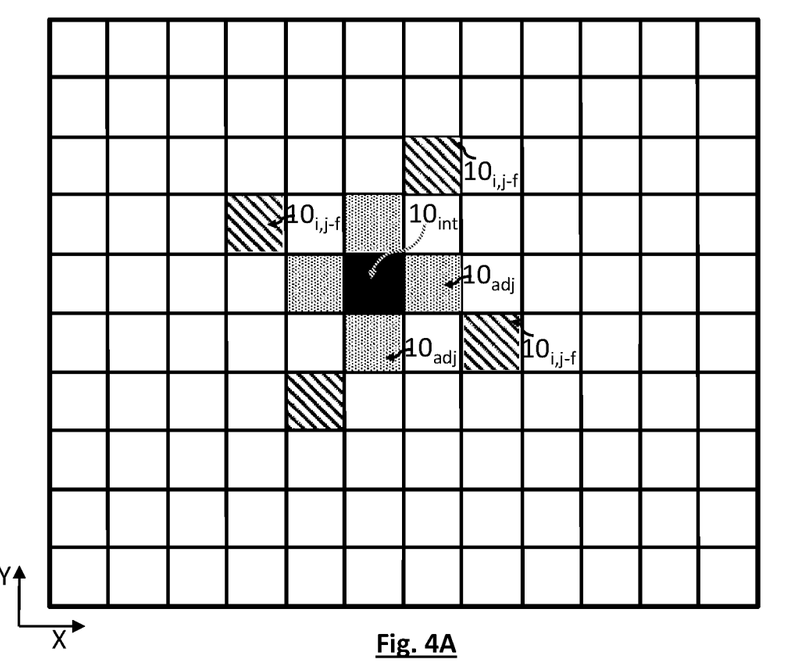
FIGS. 4A and 4B schematically show two different positions of a pixel of interest.
Figure 4B:
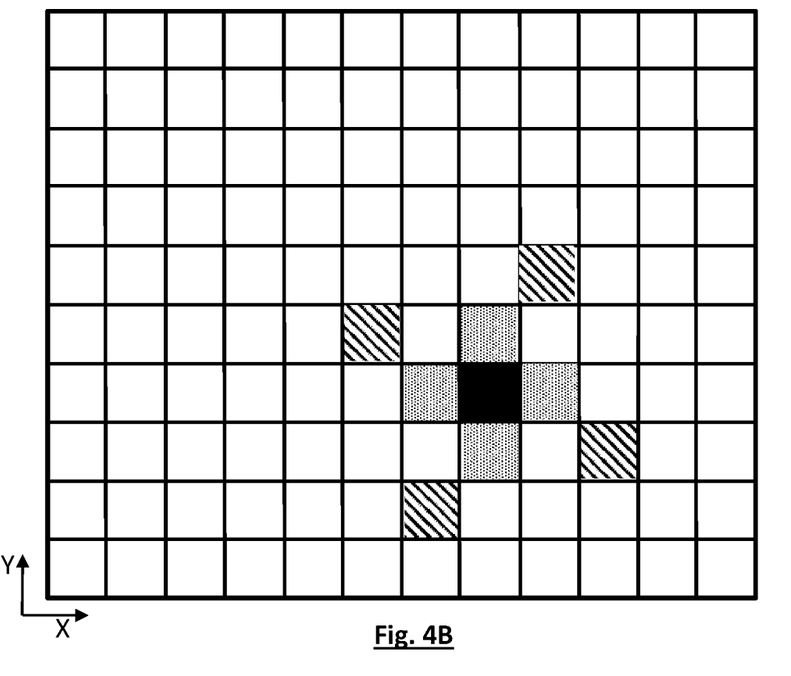

FIGS. 4A and 4B illustrate an example in which four distant pixels $10_{i,j-f}$ are selected simultaneously following the identification of a pixel of interest $10_{int}$. In FIGS. 4A and 4B, the pixel of interest $10_{int}$ is different. It has been represented by a black square. The distant pixels are hatched. In the examples shown in FIGS. 4A and 4B, if $(i_{int}, j_{int})$ corresponds to the coordinate of the pixel of interest $10_{int}$, the distant pixels $10_{i,j-f}$ are located at the coordinates $(i_{int}-2, j_{int}+1)$, $(i_{int}-1, j_{int}-2)$, $(i_{int}+2, j_{int}-1)$, $(i_{int}+1, j_{int}+2)$. Thus, according to this example, the norm of order 1 of a vector, formed by the coordinates $(i_{int}, j_{int})$ of the pixel of interest $10_{int}$ and the coordinates of each distant pixel $10_{i,j-f}$, is equal to 3. In the notation $10_{i,j-f}$, the index i,j-f means that it is a question of a distant pixel of coordinates (i,j).

One important aspect of the invention is that the relative position of each distant pixel $10_{i,j-f}$ with respect to the pixel of interest $10_{int}$ is predefined. It notably depends on the size l of the pixels and on the thickness of the detector material 2.

The number of distant pixels $10_{i,j-f}$ must not be too high, so as to save processing time following the detection of each pulse. It must however be high enough, so as to be able to characterize the bias $\beta_{i,j}$ satisfactorily. Thus, the number of distant pixels taken into account on each detection is preferably comprised between 1 and 20, and more preferably between 2 and 10. Thus, on each detection of an interaction, a small percentage of the pixels of the matrix array are considered to be distant pixels and are thus subject to an update of their bias. After a certain number of interactions, the bias of all the pixels of the matrix is considered to have been gradually updated.

The fact that the relative position of each distant pixel $10_{i,j-f}$ with respect to the pixel of interest $10_{int}$ is predefined allows various locations of distant pixels to be successively addressed. Specifically, at each detection time, the pixel of interest $10_{int}$ may vary, this leading to a variation in the position of the distant pixels $10_{i,j-f}$. On each interaction, the probability that a pixel of the matrix array is a pixel of interest may be considered to be equal for all of the pixels of the matrix array. Under such an assumption, the method allows the bias of all of the pixels of the matrix array to be regularly updated.

Following step 120, the coordinates of each distant pixel $10_{i,j-f}$ are known.

Step 130 Determining the Bias.

For each distant pixel $10_{i,j-f}$ identified in step 120, the bias-determining module 16 updates a bias value $\beta_{i,j}(t)$ depending on the highest amplitude $A_{i,j-f}(t)$ of the signal $S_{i,j-f}$ output from the pixel during the detection time interval dt. According to a first approach, it may be estimated that:

$$\beta_{i,j}(t) = A_{i,j-f}(t) \qquad (2)$$

This amounts to considering that the amplitude of the signal $S_{i,j-f}$ resulting from the detection circuit $11_{i,j}$ of a pixel $10_{i,j-f}$ having collected no charge corresponds to the bias of the pixel.

Before the detector is started up, the bias value of each pixel $10_{i,j}$ is initialized to an initial value $\beta_{init-i,j}$. It may be a question of an arbitrary value, for example defined in the course of an energy calibration, or of a zero value, or of a value resulting from a preceeding use of the detector.

After a pixel $10_{i,j}$, of coordinate (i,j) has been selected as distant pixel, the bias value that is associated therewith is updated, depending on the amplitude $A_{i,j-f}(t)$ of the detected signal $S_{i,j-f}$. As indicated above, a first option is to replace the bias value $\beta_{i,j}$, corresponding to this pixel, with the value $A_{i,j-f}(t)$ detected at the detection time. However, the inventor considered that it is preferable for the update of the bias value to be occur more gradually, taking into account a current value of the bias $\beta_{i,j}(t^-)$, i.e. the value at a time preceding the detection time. The notation $t^-$ corresponds to a time prior to the detection time t, and for example the time immediately prior to the detection time t. The update may be performed via a weighted summation of the current value $\beta_{i,j}(t^-)$ and $A_{f-i,j}(t)$.

The update may be performed using the following expression:

$$\overline{\beta}_{i,j}(t) = (1-k_{i,j})\beta_{i,j}(t^-) + k_{i,j}\beta_{i,j}(t) \qquad (3)$$

where:

$$\beta_{i,j}(t) = A_{i,j-f}(t) \qquad (2)$$

$k_{i,j}$ is a smoothing coefficient. It is a question of a strictly real number comprised between 0 and 1.

The value $\overline{\beta}_{i,j}(t)$ corresponds to the value of the bias after the update. This value is stored in the memory 17.

The smoothing coefficient makes it possible to modulate the inclusion of the bias value established at the detection time t with respect to the current value of the bias. For example, $k_{i,j}=2^{-8}$ According to one embodiment, the value of the smoothing coefficient $k_{i,j}$ may vary with time, and the position of the pixel, as a function of the number of updates of the bias that have been performed. If $n_{i,j}(t)$ designates the number of updates of the bias of a pixel $10_{i,j}$ prior to a detection time t, the smoothing coefficient $k_{i,j}$ applied to the pixel $10_{i,j}$ is such that:

$$k_{i,j}=2^{-min(8;log\ 2(n_{i,j}(t)))} \quad (4)$$

where $log_2$ is the logarithm to the base 2.

$n_{i,j}(t)$ may for example correspond to the number of updates of the bias of a pixel $10_{i,j}$ that have been performed since the initialization of the bias.

According to this embodiment, the smoothing coefficient is equal to $2^{-8}$ when at least 256 updates have been performed. This corresponds to a number, equal to 256, of occurrences in which the pixel $10_{i,j}$ in question was considered to be a distant pixel. Such an embodiment amounts to over-weighting the first updates performed after initialization, until their number reaches 256.

Following step 130, the respective biases of each distant pixel are updated using expression (2), with expression (3) optionally taken into account. They are stored in a memory respectively connected to each pixel in question.

Step 140: Storing the Bias in Memory.

In step 140, the various biases updated in step 130 are stored, for each pixel, in the memory 17.

Step 150: Quantifying the Energy Collected by the Pixel of Interest.

In step 150, the quantification function $g_{i,j}$ established for the pixel of interest $10_{int}$ is applied so as to estimate the energy $E_{int}$ corresponding to the pulse collected by this pixel.

Thus, $$E_{int}=g_{\alpha_{int},\beta_{int}}(A)=\alpha_{int}A-\beta_{int} \quad (5)$$

where $\alpha_{int}$ and $\beta_{int}$ correspond to the gain and bias corresponding to the pixel of interest $10_{int}$, respectively.

Step 150 is implemented by the energy-quantifying module 18.

Step 160: Taking into Account Adjacent Pixels.

Following an interaction, certain charge carriers 6' may reach pixels $10_{adj}$ adjacent the pixel of interest $10_{int}$. In this case, the method takes into account the signal $S_{i_{adj},j_{adj}}$ formed by each adjacent pixel $10_{adj}$ that exceeds the amplitude threshold $A_{th}$ during the detection interval dt.

Thus, $$E_{adj}=g_{\alpha_{adj},\beta_{adj}}(A)=\alpha_{adj}A-\beta_{adj} \quad (6)$$

where $\alpha_{adj}$ and $\beta_{adj}$ correspond to the gain and bias corresponding to the adjacent pixel $10_{adj}$, respectively.

In the example shown in FIGS. 4A and 4B, the 4 adjacent pixels $10_{adj}$ closest the pixel of interest $10_{int}$ have been taken into account. The adjacent pixels $10_{adj}$ have been drawn with a texture formed of small dots in FIGS. 4A and 4B. Step 160 is performed for each adjacent pixel in question.

Step 160 is optional. It is implemented, by the energy-quantifying module 18, when the size of the pixels is such that a non-negligible percentage of the charge carriers is liable to be collected by at least one adjacent pixel.

Step 170: Estimating the Energy Released by the Photon.

The amplitude of the energy released in the detector by the incident gamma photon may be estimated on the basis of the energy collected by the pixel of interest and of any energy collected by each adjacent pixel. Generally, the energy E(t) released at the detection time is considered to correspond to the sum of the energies respectively collected by the pixel of interest $10_{int}$ and each adjacent pixel $10_{adj}$ producing a pulse S the amplitude of which exceeds the amplitude threshold $A_{th}$.

Step 180: Locating the Interaction

Optionally, the device 1 may be employed to estimate a position of the interaction in the detector material, and in particular in a plane parallel to the detection plane. If adjacent pixels are not taken into account, the position of the interaction corresponds to the position of the pixel of interest $10_{int}$. When the adjacent pixels are taken into account, in step 160, the position of the interaction may be refined via a computation, for example a centroid computation. The centroid computation consists in weighting the coordinates of each pixel by the energy collected by the latter. It is a question of a method known to those skilled in the art, allowing the position of the interaction to be estimated with a resolution better than the size of each pixel. This step is performed by the processing unit 19.

Steps 100 to 180 are repeated on each new detection of an interaction.

Resetting the Peak Detectors.

According to one embodiment, the device is such that each peak detector $15_{i,j}$ respectively associated with each pixel $10_{i,j}$ is periodically reset. Specifically, as long as a pixel does not collect charge carriers resulting from an interaction, a drift potential $V_{drift}$ gradually accumulates in each peak detector $15_{i,j}$. After a certain length of time, the drift potential $V_{drift}$ may significantly impact the estimation of the bias. In order to avoid such a drift, zeroing of all of the peak detectors $15_{i,j}$ may be commanded periodically. The reset period may for example be 1 ms. Such a reset allows the peak detectors $15_{i,j}$ to be reset so as to prevent the drift potential $V_{drift}$, in each peak detector $15_{i,j}$, from becoming excessive.

Variant

Between two successive resets of a peak detector $15_{i,j}$, it is preferable to take into account the existence of the drift potential $V_{drift}$. In a calibration phase, in the absence of incident radiation, the variation in the drift potential $V_{drift}$ as a function of time may be determined for each pixel. Thus, for each pixel, a time-dependent drift function $V_{drift}(t')$, where t' is the amount of time that has passed since the preceding reset of the peak detector $15_{i,j}$ connected to the pixel, is obtained. The time-dependent drift functions of each pixel may be averaged, so as to obtain an average function $\overline{V}_{drift}(t')$, which is considered to be applicable to each pixel.

When such a function is taken into account, expression (2) is replaced by:

$$\beta_{i,j}(t)=A_{i,j,j}(t)-\overline{V}_{drift}(t') \quad (2')$$

Taking into account the drift charge, in the estimation of the bias, is optional. After digitization, the drift charge is considered to correspond to 30 to 350 LSB (least significant bits), whereas the bias is considered to correspond to 3000 to 4000 LSB (least significant bits).

The method described above has the following advantages:

the bias of the pixels is estimated during use of the detector. This is due to the fact that, on each event, the method comprises an update of the bias of pixels that are distant, and therefore considered to be non-essential to the processing of the event;

the distribution of the pixels the bias of which is updated varies as a function of the position of the pixel of interest in the matrix array of pixels. This allows all of the pixels of the detector to be gradually updated.

on each event, the bias of a low number of pixels is updated, this meaning the method is not resource intensive and remains compatible with rapid acquisition rates.

The method may be implemented such that, following the detection of an event, and the determination of the pixel of interest, a read mask is applied to the matrix array, so as to identify the distant pixels. The read mask is centered on the pixel of interest $10_{int}$ and defines the respective positions of the distant pixels $10_{i,j-f}$ and of any adjacent pixels $10_{adj}$. Thus, the number of pixels read on each event is comprised between 2 (the pixel of interest and 1 single distant pixel, no adjacent pixels being taken into account) and 10, or even 15 (one pixel of interest and 4 or 6 adjacent pixels, the other pixels being distant pixels). When the pixel of interest is located on a border of the matrix, or in proximity to the border, the number and position of the distant pixels, and of any adjacent pixels, are adapted.

The invention will possibly be implemented in measurement applications for locating radioactive sources, for example in nuclear installations or in the environment.

The invention claimed is:

1. A method for determining a bias affecting at least one pixel of a detector of ionizing radiation, the detector comprising a plurality of pixels, each pixel being configured to collect charge carriers generated by an interaction of the ionizing radiation in the detector, and to form a pulse under the effect of the generation and collection of the charge carriers, the pixels being distributed in a matrix array, the method comprising:
    a) following an interaction in the detector, at a detection time, determining at least one pixel forming a pulse that exceeds an amplitude threshold, defined beforehand, during a detection time interval established on the basis of the detection time;
    b) among each pixel determined in step a), selecting the pixel that generates a highest amplitude during the detection time interval, the selected pixel being a pixel of interest;
    c) selecting at least one distant pixel, the position of the distant pixel, with respect to the pixel of interest, being defined beforehand, such that the effect of the interaction, detected by the pixel of interest, on the distant pixel, is considered as negligible;
    d) measuring an amplitude of a signal generated by each distant pixel in the detection time interval;
    e) on the basis of each measurement performed in step d), determining a bias at the detection time for each distant pixel;
    f) updating the bias affecting each distant pixel depending on the bias determined at the detection time.

2. The method as claimed in claim 1, wherein step a) comprises:
    determining a detection time, at which a first pixel forms a first pulse that exceeds the amplitude threshold;
    defining the detection time interval, which extends from the detection time, the duration of the detection time interval being predetermined;
    determining, in the detection time interval, pixels forming a pulse that exceeds the amplitude threshold.

3. The method as claimed in claim 1, wherein step b) comprises selecting a plurality of distant pixels, the position of each distant pixel with respect to the pixel of interest being defined beforehand.

4. The method as claimed in claim 1, wherein the position of each distant pixel, in the matrix array of pixels, changes depending on the position of the pixel of interest, in the matrix array of pixels.

5. The method as claimed in claim 1, wherein, in step f):
    prior to the detection time, each pixel is affected by a current bias ($\beta_{i,j}(t^-)$);
    following detection of the interaction, the bias is updated, for each distant pixel, depending on the current bias and on the bias determined at the detection time.

6. The method as claimed in claim 5, wherein the bias is updated via a weighted summation of the current bias and of the bias at the detection time.

7. The method as claimed in claim 6, wherein the bias of a distant pixel, at the detection time, is affected by a weighting factor that varies as a function of a number of updates of the bias that have been performed for the distant pixel since an initialization, such that the lower the number of updates of the bias that have been performed, since initialization, the higher the contribution of the bias measured at the measurement time.

8. The method as claimed in claim 1, comprising, following step b):
    selecting at least one pixel adjacent the pixel of interest;
    measuring the amplitude of the pulse generated by the pixel of interest and of the pulse generated by each adjacent pixel;
    estimating an energy released in the course of the interaction depending on the amplitudes measured for the pixel of interest and for each adjacent pixel.

9. The method as claimed in claim 1, wherein each pixel comprises a peak detector, such that an interaction is considered to have been detected when an amplitude of a pulse, resulting from the collection of charge by the pixel, exceeds the predefined amplitude threshold, the method comprising a periodic reset of each peak detector.

10. The method as claimed in claim 9, comprising, between two successive resets of a peak detector, estimating a drift signal that adds to the signal resulting from the collection of charge by the pixel, the method being such that, in step e), the drift signal estimated at the detection time is subtracted from the bias.

11. A method for estimating an energy corresponding to charge carriers collected by a pixel of a pixelated detector for detecting ionizing radiation, each pixel being configured to collect charge carriers generated by an interaction of the ionizing radiation in the detector, and to form a pulse under the effect of the collection of the charge carriers, the pixels being distributed in a matrix array, the method comprising, when the amplitude of a pulse formed by the pixel, following a collection of charge carriers, exceeds a predefined threshold:
    determining the amplitude of the pulse;
    applying an energy-quantification function to the determined amplitude;
    wherein the energy-quantification function is parameterized by a bias, the bias being estimated using a method as claimed in claim 1.

12. A device for detecting ionizing radiation, comprising various pixels of a pixelated detector, each pixel being configured to collect charge carriers generated by an interaction of the ionizing radiation in the detector, and to form a pulse under the effect of the collection of the charge carriers;

wherein the device comprises a processing unit configured to implement steps a) to f) of a method as claimed in claim 1 for each pulse formed by at least one pixel.

\* \* \* \* \*

UNITED STATES PATENT AND TRADEMARK OFFICE
CERTIFICATE OF CORRECTION

PATENT NO. : 11,249,205 B2  Page 1 of 1
APPLICATION NO. : 17/130853
DATED : February 15, 2022
INVENTOR(S) : Stanchina It is certified that error appears in the above-identified patent and that said Letters Patent is hereby corrected as shown below:

On the Title Page

On Page 2, Column 2, Item (56), under "U.S. PATENT DOCUMENTS" Line 9, delete "Berg" and insert -- Rothberg --, therefor.

Signed and Sealed this
Tenth Day of May, 2022

Katherine Kelly Vidal
*Director of the United States Patent and Trademark Office*